(12) United States Patent
Rottermann et al.

(10) Patent No.: US 7,394,593 B2
(45) Date of Patent: Jul. 1, 2008

(54) TRANSMITTED-LIGHT BASE FOR A MICROSCOPE, AND METHOD FOR REGULATING THE ILLUMINATION INTENSITY OF A TRANSMITTED-LIGHT BASE

(75) Inventors: Ruedi Rottermann, Berneck (CH); Patrick Kopf, Altach (AT); Otto Geschwentner, Balgach (CH); Klaus-Peter Zimmer, Heerbrugg (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 72 days.

(21) Appl. No.: 11/286,835

(22) Filed: Nov. 23, 2005

(65) Prior Publication Data
US 2006/0133084 A1 Jun. 22, 2006

(30) Foreign Application Priority Data
Nov. 24, 2004 (DE) ................. 10 2004 056 685

(51) Int. Cl.
*G02B 21/06* (2006.01)
(52) U.S. Cl. .................. 359/388; 359/232; 359/385; 359/738; 362/279; 362/282; 362/290; 362/325
(58) Field of Classification Search .................. None
See application file for complete search history.

(56) References Cited

U.S. PATENT DOCUMENTS

| 4,106,851 | A | | 8/1978 | Considine et al. |
| 4,812,913 | A | * | 3/1989 | Knop et al. ................. 358/474 |
| 6,898,458 | B2 | * | 5/2005 | Zeng et al. ................. 600/476 |
| 2002/0044347 | A1 | * | 4/2002 | Steenblik et al. ............ 359/368 |

(Continued)

FOREIGN PATENT DOCUMENTS

DE 3538774 5/1987

(Continued)

OTHER PUBLICATIONS

Merriam-Webster's Collegiate Dictionary, Eleventh Edition, Merriam-Webster Incorporated 2004, pp. 737.*

(Continued)

*Primary Examiner*—Stephone B. Allen
*Assistant Examiner*—Derek S Chapel
(74) *Attorney, Agent, or Firm*—Simpson & Simpson, PLLC

(57) ABSTRACT

The invention relates to a transmitted-light base (1) for illuminating an object (15) for imaging through a zoom microscope (21), the transmitted-light base (1) comprising an integrated light source (3) having an associated electrical power regulation system (31) for generating a suitable radiation flux, and means (5, 6), capable of being added downstream, for generating a specified spectral intensity distribution. To allow compensation for brightness changes of low dynamic range, such as those occurring in particular during zooming, a continuously controllable mechanical brightness regulator (4) is proposed which is activatable by means of an associated adjustment device (41) in such a way that the illumination intensity of the transmitted-light base (1) is controllable with no change in the spectral intensity distribution. The brightness regulator (4) is arranged close to the light exit side of a reflector lamp (3) used as the light source, or, when a lamp (17) and collector lens (18) are used as the light source, close to the collector lens (18).

22 Claims, 6 Drawing Sheets

U.S. PATENT DOCUMENTS

2004/0095640 A1* 5/2004 Weiss .................. 359/385

FOREIGN PATENT DOCUMENTS

| DE | 3744060 | 7/1989 |
|---|---|---|
| DE | 9309879.0 | 10/1993 |
| DE | 195 13 350 A1 | 10/1995 |
| DE | 20016302 | 2/2001 |
| EP | 1418454 | 5/2004 |

OTHER PUBLICATIONS

Leica Microsystems (Switzerland) Ltd., Invisible becomes visible, High-performance transmitted light stand HL RC for innovative contrasting, 2003, Heerbrugg, Switzerland.

Leica Microsystems (Switzerland) Ltd., Leica transmitted-light base HL RC, 2003, Heerbrugg, Switzerland.

Leica Microsystems Brochure MI-216-2en, "Invisible becomes visible; High-performance transmitted light strand HL RC for innovative contrasting,," 2003.

Zeiss Superlux 301 Service Manual, 2000.

* cited by examiner

TRANSMITTED-LIGHT BASE FOR A MICROSCOPE, AND METHOD FOR REGULATING THE ILLUMINATION INTENSITY OF A TRANSMITTED-LIGHT BASE

CROSS REFERENCE TO RELATED APPLICATIONS

This application claims priority of German Patent Application No. 10 2004 056 685.2, filed on Nov. 24, 2004, which is incorporated by reference herein.

FIELD OF THE INVENTION

The invention relates to a transmitted-light base (transmitted illumination device) having an integrated light source for microscopes, in particular for those having continuously variable magnification (called "zoom microscopes" for short), such as high-power stereo zoom microscopes, and to a method for regulating the illumination intensity of a transmitted-light base. More precisely, the invention relates to a transmitted-light base for illuminating an object for imaging through a zoom microscope, that transmitted-light base comprising a light source having an associated electrical power regulation system for generating a suitable radiation flux, and means, capable of being added downstream, for generating a specified spectral intensity distribution. The method according to the present invention refers to the modification or regulation of the illumination intensity and of the spectral intensity distribution of a transmitted-light base for an object examination by imaging of an object with a zoom microscope.

BACKGROUND OF THE INVENTION

A transmitted-light base serves to transilluminate an object in a manner suitable for viewing with a microscope. For that purpose, the light directed by the transmitted-light base onto the object generates a radiation at a solid angle at every point in the illuminated object field. The radiation flux that proceeds from a point in the object field at an infinitesimal solid angle is referred to as the radiant intensity.

"Regulation of the illumination intensity" of a transmitted-light base is understood here to be regulation of the radiant intensity. In contrast, for example, to modifications of the illuminated field diameter or the numerical aperture of the illumination system, which influence the distribution of the radiant intensity as a function of location or angle, in the context of a regulation of the illumination intensity of the transmitted-light base only the radiant intensity is regulated, independently of location and angle.

Transmitted-light bases of this kind having an integrated light source are known. The light source usually has associated with it an electrical power regulation system with which the current or voltage at the light source can be adjusted. Regulation of the illumination intensity is then usually accomplished by varying the voltage at the light source. Provision may furthermore be made, alternatively or additionally, for the use of neutral gray filters.

A regulation of the illumination intensity may be necessary for various reasons: on the one hand, known transmitted-light bases allow object illumination using various illumination modes, e.g., transmitted bright-field, oblique illumination, or relief contrast. These illumination modes, like the object-dependent transmission properties of the specimens being examined, greatly influence the image brightness. Ultimately the desired image brightness also depends on the individual user. A regulation of the illumination intensity is also necessary during an object examination using a zoom microscope, since the image-side aperture and therefore the image brightness vary upon actuation of the zoom. An object examination at constant image brightness is, however, necessary or at least desirable, for example in order to avoid incorrect exposures when cameras are used, or to ensure the comparability of images of an examination series.

The aforementioned factors that can influence image brightness show that a high dynamic range in the illumination intensity is necessary in order to be able to use all observation or illumination modes and device configurations.

For specific applications, moreover, not only a specific image brightness but also a specific color temperature or spectral intensity distribution is necessary. "Color temperature" refers to the temperature of the black body having (approximately) the same spectral distribution as the illumination source. In general, the color temperature of electrical illumination sources changes when the electrical power level delivered to the light source changes. In the case of incandescent or halogen lamps, which have light emission characteristics similar to a black body, the color temperature of the spectrum emitted by the light source shifts, upon a reduction in the electrical power level delivered, from the blue spectral region to the red spectral region (also referred to as "red shift"). A color temperature shift of this kind modifies the perceived color of the object image, thus making it difficult to compare the results in different illumination modes. This illustrates the fact that for specific applications, not only an (almost) constant image brightness but also an (almost) constant color temperature is desired.

EP 1 418 454 A2 discloses a microscope and a method with which the brightness and the perceived color of the object image can be kept constant. The teaching of this document is based on the problem that changes in settings regarding the resolution and contrast of the microscope are overlain by a change in the brightness of the microscope image. At the same time, with ordinary light sources a brightness correction results (as already mentioned above) in a change in color temperature. The aforesaid document proposes, as a solution, to arrange in the illumination or image beam path spectral correction means that correct the change caused in the spectral intensity distribution (color temperature) of the light emitted by the light source, in such a way that the spectral intensity distribution of the light directed onto the object remains largely unchanged. The spectral correction means encompasses a color filter that is embodied as a circular disk-shaped interference filter, different filter areas exhibiting different spectral interference capabilities and associated transmission capabilities. Depending on the rotation of the circular disk-shaped filter, a color temperature decrease occurring as a result of a voltage decrease can be compensated for by partial introduction of the corresponding filter area into the aperture of the illumination device. Further suitable spectral correction means encompass absorption or reflection filters. In an automated method, for example, the aperture of the illumination beam path is decreased in order to increase the image contrast, this being associated on the other hand with lower resolution and lower image brightness. The decreased image brightness can automatically be compensated for by means of a control computer, by way of an increase in the electrical power level to be delivered to the light source of the transmitted-light base. At the same time, the control computer also calculates the requisite position of the color filter, so that an almost unchanged spectral intensity distribution of the light directed onto the object exists.

The teaching described in EP 1 418 454 A2 is usable for compound microscopes, and requires that an aperture device of the illumination system (e.g., diaphragm) be accessible. In this context, the aperture and the image of the objective entrance pupil generated by the illumination condenser correspond to one another. In zoom microscopes having a high zoom factor, the objective entrance pupil corresponds to an aperture that changes in terms of diameter and location upon actuation of the zoom. In microscopes having a high zoom factor in particular, the aperture—and therefore the filter area serving to correct the color temperature—changes appreciably. In stereo zoom microscopes, the two entrance pupils correspond to two apertures, one for the right and one for the left stereoscopic beam path, which change in terms of both their diameter and their location upon actuation of the zoom. It cannot be expected that introduction of a color filter into the illumination beam path, as proposed in the aforesaid document, will result upon zooming in a constant color temperature that is identical for both stereo channels.

Transmitted-light bases without an integrated light source are fed by light guides, associated with which are lamp housings that permit both controllability of the image brightness at a constant color temperature and the setting of a specified color temperature. This is done by way of a mechanical arc-shaped stop and a voltage regulation system in the lamp housing. A device of this kind as known from lamp housings for fiber illumination systems is not, however, implemented in transmitted-light bases having an integrated illumination system. In these lamp housings, the light of a reflector lamp is concentrated onto the small diameter of the light guide entrance and there cut off, as applicable, by an arc-shaped stop. The inhomogeneity of the illumination of the fiber entrance is almost eliminated by the intermixing of the fibers in the light guide, so that the light guide exit can be used for homogeneous illumination of an object. This advantageous arrangement in lamp housings necessitates the use of light guides, and therefore cannot be used in transmitted-light bases having an integrated light source.

SUMMARY OF THE INVENTION

It is consequently the object of the present invention to make possible, in a transmitted-light base having an integrated light source for zoom microscopes, controllability of the illumination intensity and thus of the brightness at a constant color temperature, and also the setting of a specified color temperature.

The present invention achieves the aforesaid object with a transmitted-light base having the features of Claim 1 or 2. In a first embodiment of the invention, the light source of the transmitted-light base is embodied as a reflector lamp, and arranged close to the light exit side of the reflector lamp is a continuously controllable mechanical brightness regulator which is activatable by means of an associated adjustment device in such a way that the illumination intensity of the transmitted-light base is controllable with no changes in the spectral intensity distribution. A brightness regulator of this kind placed after the reflector lamp allows the illumination intensity in the transmitted-light base to be controlled or regulated within a specific range with no need to modify the electrical power level of the light source, and therefore without causing the spectral intensity distribution (color temperature) to change. What is created by way of the invention is thus an ideal instrument for adapting or readjusting the image brightness in a transmitted-light base having an integrated light source, in particular for zoom microscopes, within a specific range specified by the mechanical brightness regulator.

In another embodiment of the invention, the light source of the transmitted-light base is embodied as a lamp having a downstream collector lens, and arranged close to the collector lens is a continuously controllable mechanical brightness regulator having an associated adjustment device by way of which the brightness regulator is activatable in such a way that the illumination intensity of the transmitted-light base is controllable with no change in the spectral intensity distribution. In this embodiment of the light source, the brightness regulator can be arranged both in front of and also behind the collector lens in the illumination direction.

It has become apparent that an arrangement of the brightness regulator close to the reflector lamp or to the collector lens is necessary for homogeneous illumination of the object plane of the transmitted-light base, the brightness regulator preferably being arranged in a region that extends from directly at the reflector exit side or collector lens to a distance of at most half the reflector diameter or half the diameter of the collector lens. It has become apparent, surprisingly, that sufficient image homogeneity is guaranteed with the transmitted-light base according to the present invention and the aforesaid arrangement of the brightness regulator. Furthermore, with this arrangement the illumination aperture as well as the illuminated field is not substantially influenced. The mechanical brightness regulator differs greatly, in this context, from the known stops, which influence the radiant intensity in the object field as a function of location and angle.

It has become apparent that the mechanical brightness regulator according to the present invention can be optimally adapted to the comparatively low dynamic range of the brightness change in the context of the zoom operation. It is thus generally possible to compensate for image brightness changes during the zoom operation, in the context of an object examination, primarily or exclusively by way of the mechanical brightness regulator.

The illumination intensity of the transmitted-light base is preferably controllable at least in a range of 1:5 with the mechanical brightness regulator. Be it noted in this connection that the mechanical brightness regulator can be used in general for a brightness regulation action with a low dynamic range. This can be the case not only for the previously mentioned zoom operation but also for a user-dependent desired brightness change or an object-dependent brightness change. It is also possible for certain changes in the illumination modes of the transmitted-light base to result in only small brightness changes that can be compensated for with the mechanical brightness regulator.

The mechanical brightness regulator is preferably embodied as a louver having slats. Such a configuration allows the emission surface of the light source to be completely covered, and allows a brightness change, i.e., a change in the radiation flux of the light radiated from the light source, to be effected within that surface. With this embodiment, the slats are adjustable as to their position by way of the adjustment device associated with the brightness regulator.

It is advantageous if the louver comprises at least four slats; six or eight slats are additionally advantageous. The exact number of slats depends principally on the diameter of the light source, the size of the individual slats, and the desired accuracy of the brightness regulation. An even number of slats is advantageous, since the same number of slats can then be arranged above and below the optical axis. It is further advantageous if the slats are arranged parallel to one another, each tiltably about an axis in a plane perpendicular to the illumination direction. With the louver in an open position, the slat surfaces are then aligned parallel to the illumination direction, so that the least possible attenuation of the illumination intensity takes place, whereas with the louver in a closed position, the slat surfaces are at an angle to the illumination direction (in the extreme case, perpendicular to the illumination direction), thus resulting in the greatest possible attenuation of the illumination intensity.

It is furthermore useful if the slats of the louver are fabricated from metal. The use of metal strips as slats is a good choice especially when a reflector lamp is used, since the material must be temperature-resistant. A different slat material can be used depending on the light source used. Partially transparent materials are also conceivable, provided the desired dynamic range of the illumination intensity can be achieved by an adjustment of the slats.

It has proven useful to couple the slats above the optical axis, as well as the slats below the optical axis, respectively with one another. The upper and the lower slats can then move in opposite directions upon closing of the louver, so that the center slats meet at the axis. Opening and closing of the louver is effected by the associated adjustment device, which can be a simple operated manually lever, or an electronically controlled positioning member. The louver is adjusted in known fashion.

It has further proven to be very advisable if the slats comprise a profile at least along their longitudinal edges, in particular a profile in the form of a sawtooth profile. In the context of a partly or entirely closed louver, this kind of profiling of the longitudinal edges of the slats increases the homogeneity of the illumination as compared with a straight longitudinal edge of a slat, since more points contribute overall to the illumination than in the case of a straight slat edge geometry. It is useful in this context if both longitudinal edges of a slat possess a sawtooth profile, the sawtooth profiles being located symmetrically with respect to one another (i.e. meshing into one another), but possibly at a distance from one another, in the closed position of the louver.

It has become apparent, surprisingly, that despite the absence of rotational symmetry, the use of a louver having slats arranged in parallel fashion makes possible acceptable homogeneity in the illumination of the object plane and thus in the image brightness.

As an alternative to a louver, as a mechanical brightness regulator that does not modify the size of the illuminated object field and the numerical aperture of the illumination, two identical checkerboard-like mesh panels arranged behind one another can be used, the brightness regulation being accomplished by the fact that the mesh panels are shifted laterally with respect to one another. With this alternative embodiment, the light loss resulting from the strut widths even in the "open" position has a disadvantageous effect.

A suitable configuration of a transmitted-light base according to the present invention encompasses, in addition to the aforementioned integrated light source, the mechanical brightness regulator and the means that are usefully attached for generating a specified spectral intensity distribution from an illuminating optical system, and possibly an aperture device. The illuminating optical system usefully comprises a collector lens that collimates the light emitted from the light source onto a frosted glass disk. The illuminating optical system furthermore advantageously encompasses Fresnel lenses that collimate the light radiated from the frosted glass disk. A deflection mirror can also be provided, which deflects the light collimated by the Fresnel lenses in the direction of the object to be examined, and thus in the direction of the axis of symmetry of the microscope. Stops that influence the illumination aperture can also be provided as an aperture device, in order to enhance image contrast. It is also useful if the position of the deflection mirror is modifiable. A detailed description of such a transmitted-light base and the associated illumination modes may be found in the exemplifying embodiments.

The subject matter of the invention is furthermore the overall assemblage made up of a microscope and a transmitted-light base according to the present invention, the microscope comprising a zoom system. As already mentioned initially, the transmitted-light base according to the present invention having the mechanical brightness regulator is optimally suitable for a zoom microscope, since the dynamic range of the mechanical brightness regulator can be ideally adapted to the dynamic range of the brightness change during the zoom operation. In particular for stereomicroscopes that contain two zoom systems (one in the right and one in the left stereoscopic beam path), it is possible to achieve easy compensation for the brightness change during zooming with no need to regulate each of the two stereoscopic channels in terms of such brightness compensation, and without having to intervene in those channels. The transmitted-light base according to the present invention is suitable in particular for stereomicroscopes having a high zoom factor, typically z>15 (the zoom factor indicates the ratio between maximum and minimum zoom magnification).

Be it noted once again in this connection that the transmitted-light base according to the present invention, with its mechanical brightness regulator, makes possible in general compensations for brightness changes having a low dynamic range, i.e. including those that are not governed (only) by the zoom operation. Examples of such brightness changes have already been given above.

In the context of the microscope according to the present invention it is advantageous if a sensor for determining the image brightness is provided on the image side, and if furthermore a control unit is provided for actuating the mechanical brightness regulator of the transmitted-light base as a function of the image brightness determined by means of the sensor. Such an arrangement permits automatic correction of a modified image brightness by corresponding adjustment of the mechanical brightness regulator of the transmitted-light base. This image brightness correction is, as already mentioned, possible only within the range specified by the brightness regulator. It may therefore additionally be useful if a control unit is provided which actuates the electrical power regulation system of the light source, and the means for generating a specified spectral intensity distribution in the transmitted-light base, as a function of the image brightness determined by the sensor. With this arrangement, brightness changes can be compensated for by the fact that the power level of the light source is correspondingly adapted. Because this results in a change in color temperature, the means for generating a specified spectral intensity distribution are simultaneously activated in order to compensate for a color temperature change. It is useful if this type of image brightness correction engages only when the image brightness correction made possible by actuation of the mechanical brightness regulator reaches its limits. It is advisable for that purpose to bring the aforementioned control unit into effective connection with the three components (mechanical brightness regulator, power control system of the light source, means for modifying color temperature).

The invention furthermore relates to a method for regulating the illumination intensity and regulating the spectral intensity distribution of a transmitted-light base, for an object examination by imaging of an object using a zoom microscope. The transmitted-light base comprises, in this context, a light source with a power regulation system, a mechanical brightness regulator, and means, capable of being added downstream, for generating a specified spectral intensity distribution. The proposed method refers in particular to the procedure for presetting the desired image brightness, and to subsequent correction of the image brightness during the object examination.

It is useful firstly if the aforementioned three components of the transmitted-light base, namely the power regulation system of the light source, the means for setting the specified color temperature, and the mechanical brightness regulator, can be actuated independently of one another in order to set the desired image brightness and spectral intensity distribution for object examination using the microscope. This is advisable in particular for presetting of the aforesaid parameters. Once the presetting has been performed, the image brightness can be kept constant during the object examination primarily or solely by adjustment of the mechanical brightness regulator.

When the aforesaid louver is used as a mechanical brightness regulator, it is useful to perform the presetting with the louver in the open (or closed) position, so that an actuation of the louver during the object examination results in a decrease (or increase) in image brightness.

The following method having steps A) to E) has proven particularly advantageous, steps A) to D) describing the presetting:

A) On the transmitted-light base and on the microscope, the examination condition having the maximum requirement for illumination intensity is set. This is that illumination mode of the transmitted-light base that most attenuates the radiation flux; the same applies to the settings on the microscope, in particular on the zoom system, which is consequently brought into a position in which it most attenuates the radiation flux or the image brightness.

B) The mechanical brightness regulator is set to its position of least-possible attenuation of the illumination intensity, i.e., when the aforesaid louver is used, it is brought into the aforesaid open position. At the same time, the means for generating a specified spectral intensity are removed or are brought into a position in which no change in color temperature is caused.

C) The desired image brightness is then set by corresponding power regulation of the light source. This is a setting in the upper range of the electrical power of the light source, so that the maximum brightness requirement can be met.

D) In the event of an undesired spectral intensity distribution, i.e. an undesired color temperature, the means for deliberate color temperature modification are introduced into the transmitted-light base or brought into the corresponding position, and the desired image brightness is once again set by regulating the power of the light source. This action is also suitable in the event the electrical power regulation system of the light source is not sufficiently controllable. This is the case, for example, when the control range of the potentiometer of the electrical power regulation system encounters a limit because of an excessive red (or blue) shift. In this case the control range can be expanded again after a deliberate color temperature change. After this presetting of the desired image brightness and spectral intensity distribution, in the following step E) preferably only the mechanical brightness regulator is actuated, so that the image brightness at the preset spectral intensity distribution is kept constant during the object examination, in particular in the context of a zoom operation.

It is useful in the context of the above-described method if, in step A), the object is already in place and the microscope focused. If a constant image brightness cannot be implemented by way of the mechanical brightness regulator alone, another regulation of the electrical power of the light source can be performed, this usually being accompanied by another adjustment of the desired color temperature.

Be it noted that the aforementioned regulation of the illumination intensity for presetting (steps A) to D)) and for object examination (step E)) can also proceed from the opposite case, in which the examination conditions having the minimum requirement for illumination intensity are set on the transmitted-light base and on the microscope; in this case the louver must be brought into the closed position. Further presetting is then performed analogously, preferably only the mechanical brightness regulator being actuated, i.e., the louver being opened, for the subsequent object examination. With no limitation as to generality, reference will be made hereinafter only to the first-mentioned method according to steps A) to E).

For automation of the aforementioned method, it is useful if the aforesaid step D) is followed by a further step D1) that encompasses transfer of the adjustments of the presetting operation effected by steps A) to D) to a control unit.

This control unit can then activate at least the mechanical brightness regulator or its adjustment device in order to keep the image brightness constant during the object examination. It is moreover also useful if the control unit activates the power regulation system of the light source and the means for generating a specified spectral intensity distribution in order to keep the image brightness constant during the object examination with no color temperature, especially when the control range of the mechanical brightness regulator has been exhausted.

Be it noted that in practice, it is almost impossible to keep the spectral intensity distribution absolutely constant, but it is sufficient if the spectral intensity distribution remains substantially unchanged at least in the observable spectral region. The requirements here are of course also based on the type of observation, i.e., depend on whether an operator or a digital camera is observing or evaluating the images.

BRIEF DESCRIPTION OF THE DRAWINGS

The invention and its advantages will be explained in more detail below with reference to exemplifying embodiments illustrated in the Figures, in which.

DETAILED DESCRIPTION OF THE INVENTION

Figure 1:
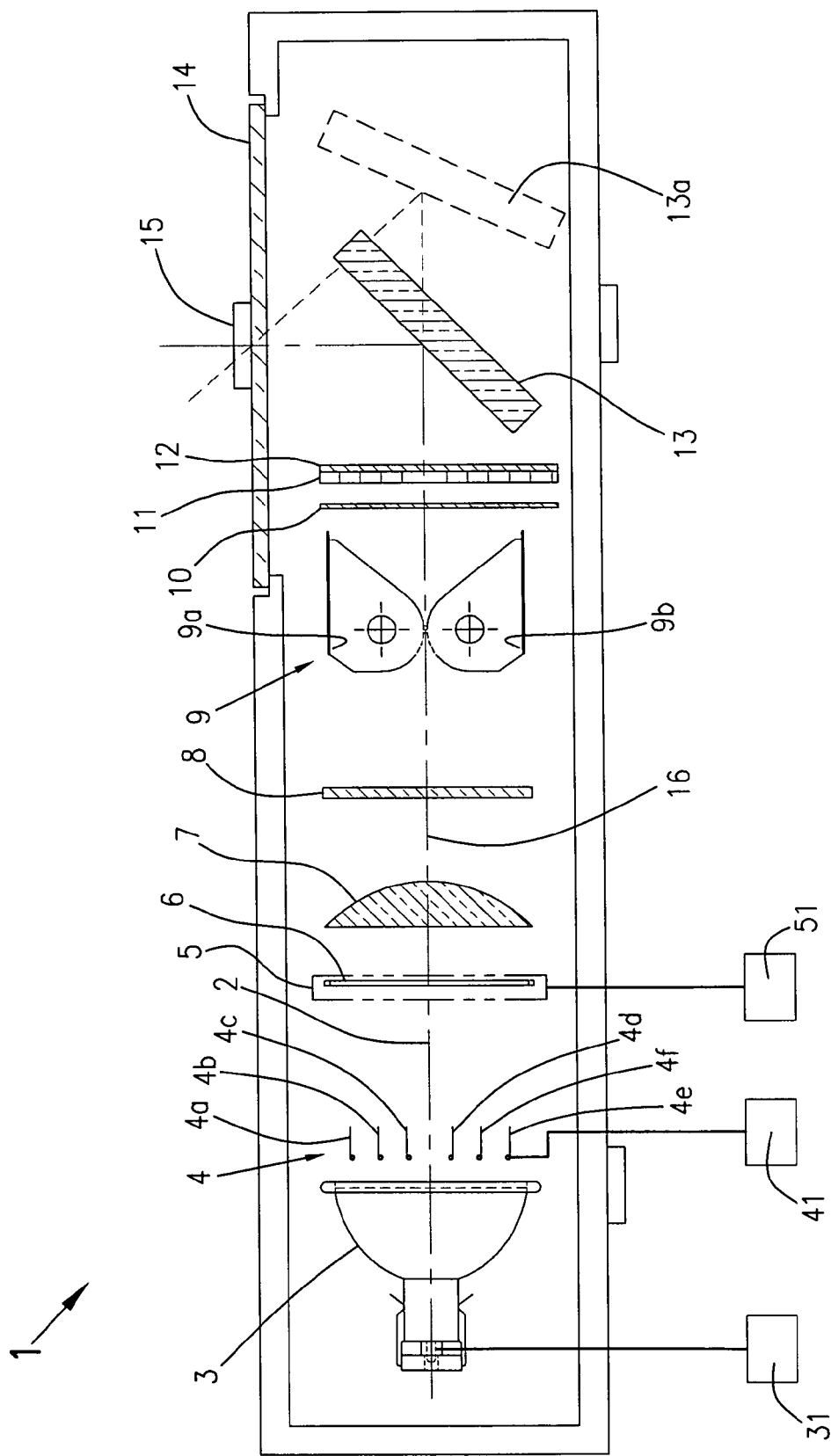
FIG. 1 is a schematic longitudinal section of an embodiment of a transmitted-light base according to the present invention.

FIG. 1 shows transmitted-light base 1 according to the present invention. The optical axis is labeled 2. A reflector lamp 3, constituting a light source, divergently emits light of a specific spectral composition. With the aid of electrical power regulation system 31, usually a voltage regulator, the light output of the lamp can be regulated in known fashion, manually or by an electronically controlled positioning member.

A louver 4, constituting a mechanical brightness regulator, is arranged close to the reflector exit. In this arrangement, the illumination aperture and the illuminated field of object plane 14 remain substantially unchanged by the mechanical brightness regulator. Louver 4 is to be actuated either manually via a lever (not depicted), or by an electronically controlled positioning member 41.

Arranged after the louver, as a means for generating a specified spectral intensity distribution, is a filter insert 5 with which a color conversion filter 6, e.g., a Schott GB34 1 mm, can either be introduced entirely into the beam path or completely removed from it, as necessary. Filter insert 5 can be actuated, in known fashion, manually or by an electronically controlled positioning member 51. Alternatively, provided the size relationships allow it, a color conversion filter wheel can also be at least partially introduced into the beam path, the filter areas of the filter wheel introduced into the beam path permitting an almost continuously variable adaptation of the color temperature.

Collector lens 7 following the filter insert collimates the light emitted by the reflector lamp onto a frosted glass disk 8.

The light emerging from frosted glass disk 8 is collimated by Fresnel lenses 10 and 12, and deflected by deflection mirror 13 onto object plane 14. In its 45-degree position, deflection mirror 13 directs the light in the direction of the axis of symmetry of microscope 21 (compare FIG. 6).

A diffuser 11 is arranged between Fresnel lenses 10 and 12 in order to suppress moire effects caused by the Fresnel lenses.

In addition, two pivotable stops 9a, 9b, which constitute a stop 9 or in general an aperture device, are installed close to Fresnel lens 10 on the side toward frosted glass disk 8.

The significance of deflection mirror 13 for object examination will first be presented. When deflection mirror 13 is arranged at 45 degrees, object 15 located on object plane 14 is vertically transilluminated. By continuous adjustment, the deflection mirror can be brought into a different position 13a, drawn with dashed lines, in which object 15 is illuminated obliquely from one side. This illumination mode is advantageous for the recognition of structures and contours, but requires an elevated illumination intensity, since a great deal of light is sent past objective 23. In addition to the various transmitted-light methods enabled by the various positions of the deflection mirror, pivotable stops 9a, 9b additionally make possible a contrasting method for colorless, transparent specimens (the so-called Rottermann contrast technique). This contrasting method also requires an elevated illumination intensity, since a great deal of light is shaded by the stops. This contrasting method allows changes in the refractive index in the specimen to be represented as differences in brightness. Phase structures then result in typically relief-like images. By precise tilting of deflection mirror 13, the relief effect produced by the built-in stops 9a, 9b can additionally be regulated from mild to strong. This contrasting method offers the capability of examining transparent objects that are almost impossible to detect in the direct transmitted-light bright field. It is thus particularly suitable for application in molecular biology, embryology, microbiology, and genetics. For objects with sufficient contrast (stained amplitude preparations), it is also possible to work in the direct transmitted-light bright field. By adjusting deflection mirror 13, the light beams can be directed through object 15 in a manner from vertical to flat, so that it is possible to work from the full bright field at maximum brightness down to a low-brightness transmitted light (similar to a dark field) in which fine contours are distinctly emphasized. Further information about the illumination modes just described may be derived from the following publication of the Applicant: Document no. M1-216-2de (or −2en for the English version)—VIII 2003 (of August 2003). The transmitted-light base used therein corresponds to the one depicted in FIG. 1 in terms of the aperture device and the displaceability and pivotability of the deflection mirror, but not in terms of the integrated light source having a downstream mechanical brightness regulator and filter insert, which are the subject matter of the present invention. Regarding possible examination methods and the various possibilities for adjusting the transmitted-light base, reference is made explicitly to the aforesaid document of the Applicant.

The configuration and function of louver 4 will be explained in more detail below. Slats 4a, 4b, 4c, 4d, 4e, and 4f are rotatable or tiltable about an axis perpendicular to the drawing plane (and to the plane of the longitudinal section through the transmitted-light base). With slats 4a-4f in a horizontal position the louver has maximum light transmission; with the slats in a vertical position, they mask the light exit from reflector lamp 3. In this exemplifying embodiment slats 4a, 4b, 4c above optical axis 2 are coupled to one another, as are slats 4d, 4e, and 4f below that axis 2. Upon closure of louver 4, however, the upper and lower slats move in opposite directions, so that center slats 4c and 4d meet on the axis. To allow the most precise possible regulation of the light flux through the louver to be achieved, four or more slats are useful. Instead of the six slats depicted in this exemplifying embodiment, eight or more slats can also be used depending on the size of reflector lamp 3.

With the construction of transmitted-light base 1 depicted in FIG. 1, frosted glass disk 8 has the function of a planar radiator. Extensions of the ray bundles used for specimen observation through object plane 14 into the interior of transmitted-light base 1 strike areas of frosted glass disk 8 that differ for the right and left stereoscopic beam paths in the event a stereomicroscope is used, and differ as a function of the objective used and the zoom setting selected. A homogeneous illumination of frosted glass disk 8 is necessary in order to obtain a homogeneous image brightness for all usable objectives and zoom settings. The size of the reflector mirror of light source 3, and the refractive power of collector lens 7, are selected so that the aforementioned observation ray bundles, as extended through frosted glass disk 8, substantially strike the reflector surface. For that reason a strong scattering effect, and a considerable light loss at the frosted glass disk associated therewith, is not necessary.

Louver 4 is furthermore close to the reflector output and is far enough away from frosted glass disk 8 to generate, upon closing, an acceptable homogeneity on the frosted glass disk and thus in the image of the specimen. When slats 4a-4f are almost closed, their tooth pattern (compare FIG. 3) promotes blurring of the slat structure on frosted glass disk 8, and therefore homogeneous illumination thereof.

Figure 2:
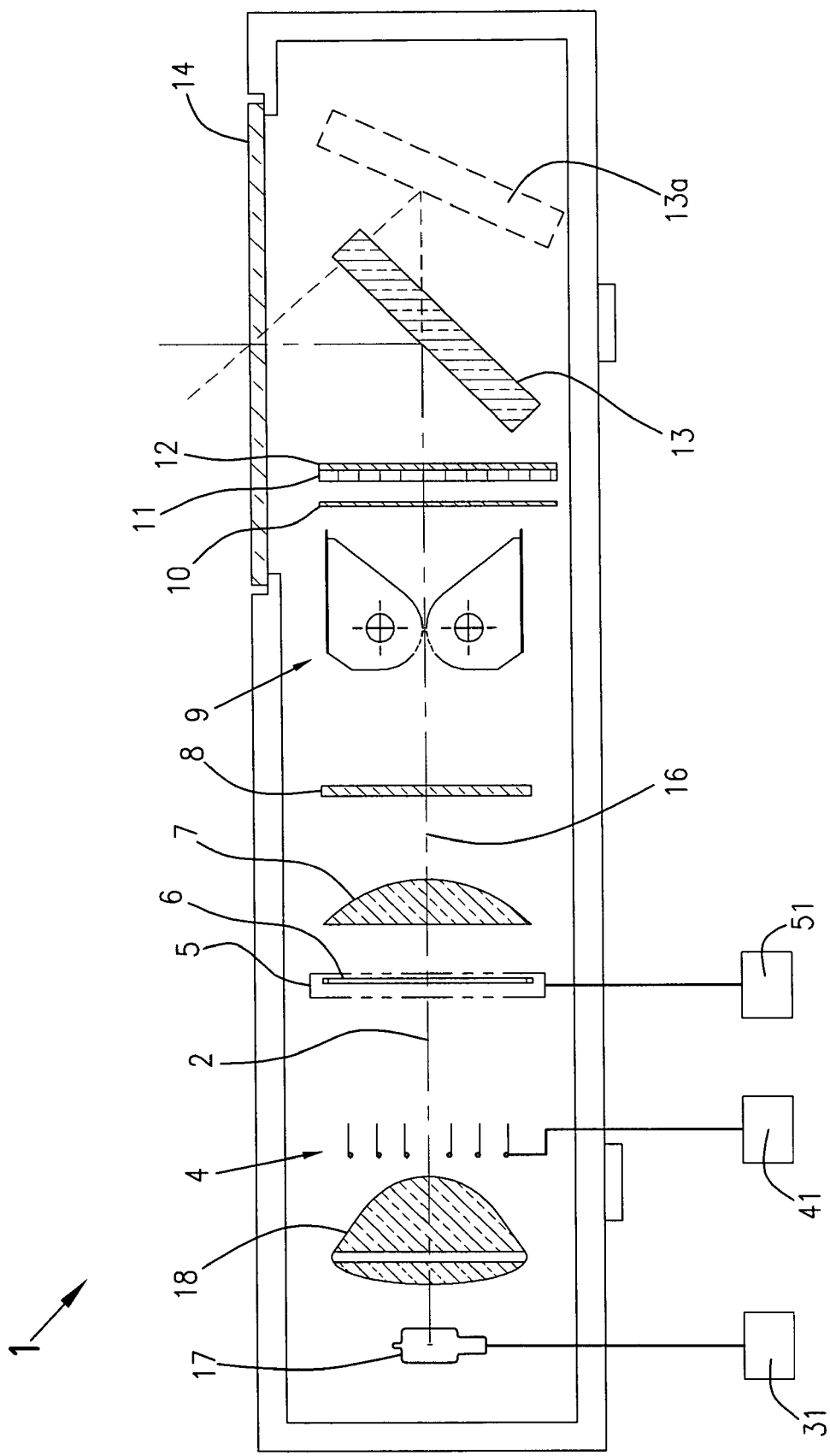
FIG. 2 is a schematic longitudinal section of a second embodiment of a transmitted-light base according to the present invention.

FIG. 2 shows a further embodiment of a transmitted-light base according to the present invention that, except for the light source, comprises the same components as the transmitted-light base of FIG. 1. Identical components are correspondingly labeled with identical reference characters. The combination of a lamp 17 with a collector lens 18 serves 25 as a light source in the transmitted-light base of FIG. 2, and a low-voltage halogen lamp is usually used as lamp 17. Collector lens 18 placed downstream has the effect of capturing a large light cone proceeding from the lamp, and directing it into the illuminating optical system that follows. The output of lamp 17 can be controlled in open-loop, or better closed-loop, fashion via a power regulator (voltage regulator) 31, so that the radiation flux and therefore radiation density on object plane 14 can be regulated. In this embodiment as well, a louver 4 is arranged close to collector lens 18 as a brightness regulator. Because the configuration and manner of operation of transmitted-light base 1 depicted in FIG. 2 otherwise correspond to the one in FIG. 1, the reader is referred to FIG. 1 for explanations.

In transmitted-light base 1 depicted in FIG. 2, louver 4 can also be placed in front of collector lens 18. In both cases it is important to ensure that the distance of louver 4 from the vertex of collector lens 18 is no greater than half the diameter of collector lens 18. Although inhomogeneities in the illuminated object field may be expected with the arrangements of light source and louver 4 depicted in FIGS. 1 and 2, it has turned out, surprisingly, that an absolutely sufficient homogeneity in the illumination of the object field can be achieved.

Figure 3:
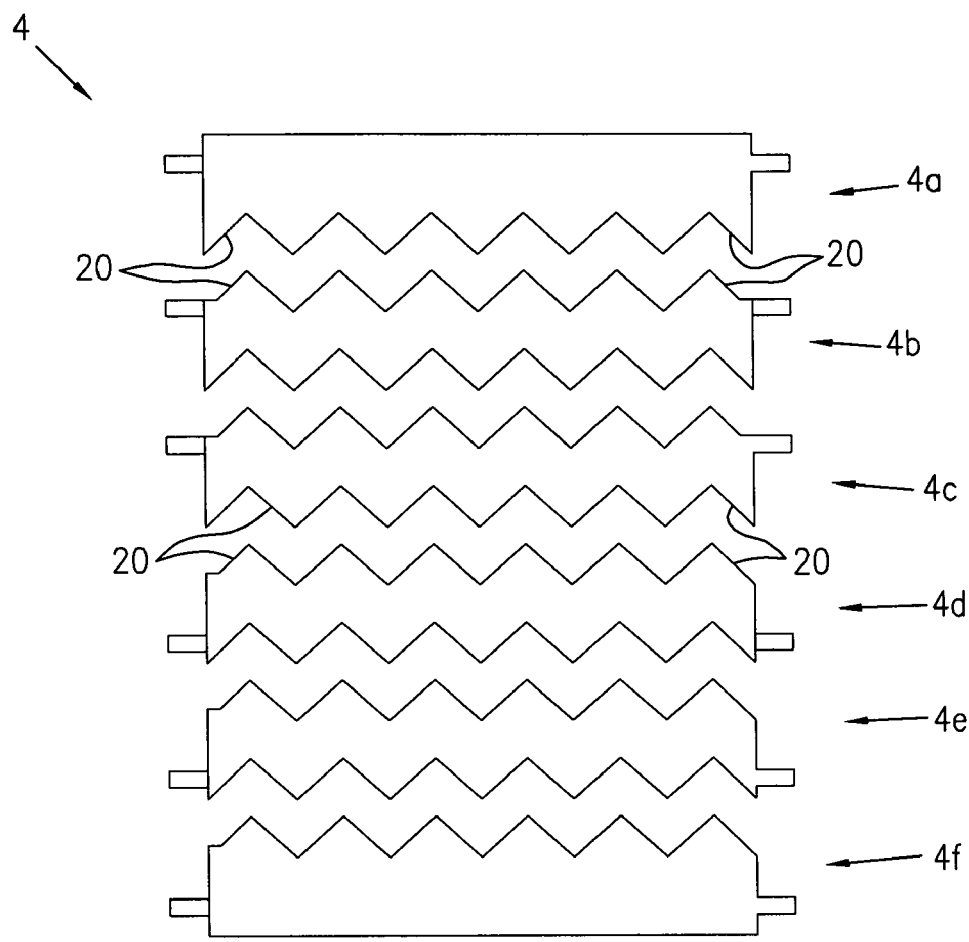
FIG. 3 schematically depicts a mechanical brightness regulator in plan view.

FIG. 3 schematically depicts a louver 4 in plan view; for better illustration of the structure of the slat edges, a closed position is shown, the distances of slats 4a, 4b, 4c, 4d, 4e, 4f from one another also being depicted in enlarged fashion. As is evident from FIG. 3, the longitudinal edges of the slats possess the form of a sawtooth profile 20, the outermost slats 4a and 4f having that profile only on their inner longitudinal edges, whereas all the other slats 4b, 4c, 4d, 4e possess a sawtooth profile 20 on both longitudinal edges. With louver 4 in the closed position, sawtooth profiles 20 of adjacent slats 4a, 4b as well as 4b, 4c, etc. consequently mesh with one another. The distances between slats 4a, 4b, 4c, etc. in the closed position are in practice much smaller than depicted in FIG. 3. A completely closed position, in which no further light passes through louver 4, can of course also be selected. The sawtooth profiling has the advantage that in comparison with straight longitudinal edges of the slats, the light of the light source passes through louver 4 at more points with a greater spatial distribution, thereby improving the homogeneity of the illumination as compared with unprofiled longitudinal edges. It has become apparent that the use of a louver 4 depicted in FIG. 3 in a transmitted-light base 1 according to FIG. 1 or 2 results in a blurring of the slat structure in the object field, and thus in an acceptably homogeneous illumination and image. Regarding the manner in which louver 4 depicted in FIG. 3 is actuated, the reader is referred to the explanations above.

It should also be mentioned that when high-magnification objectives 23 of stereomicroscope 21 are used, large illumination angles perpendicular to the drawing plane are required. To prevent Fresnel lenses 10, 12 and frosted glass disk 8 from being excessively wide, it may be advantageous to embody the tiltable and displaceable deflection mirror 13 not as a plane mirror but as a concave cylindrical mirror, the cylinder axis being located in the drawing plane. Deflection mirror 13 can also be embodied as a plane mirror on one side and as a cylindrical mirror on the back side, and can be mounted in turnable fashion so that the cylindrical mirror is usable for high-magnification objectives 23 and the plane mirror for objectives 23 that are not as strong.

Transmitted-light base 1 discussed in this exemplifying embodiment is intended in particular for the use of stereomicroscopes 21 having zoom factors of different magnitudes and objectives 23 of different magnifications. The selection of objective 23, and the observation method (see above: vertical illumination, flat illumination, contrasting methods), require different levels of light output in order to illuminate object 15. Once the objective 23 and observation method have been selected, the image brightness is further influenced by the zoom setting of zoom system 22. A high dynamic range in the illumination intensity is therefore required so that all observation and illumination modes, and all the device configurations, can be used. Additionally desirable is a regulation of the illumination intensity, which keeps the color temperature of the light constant during zooming. A lower dynamic range is all that is necessary for this regulation.

Transmitted-light base 1 according to the present invention can meet both of these requirements. The requirement for a high dynamic range in the illumination is met by electrical power regulation system 31 of light source 3 and by the selectable insertion of color conversion filters 6. This illumination intensity dynamic range can be even further increased by the mechanical brightness regulation system, i.e., here by the actuation of louver 4, the result of which is that the color temperature remains constant as the radiant intensity changes. Considered by itself, the actuation of louver 4 can achieve the lower dynamic range for regulating the illumination intensity during zoom operation with a constant color temperature.

Figure 4:
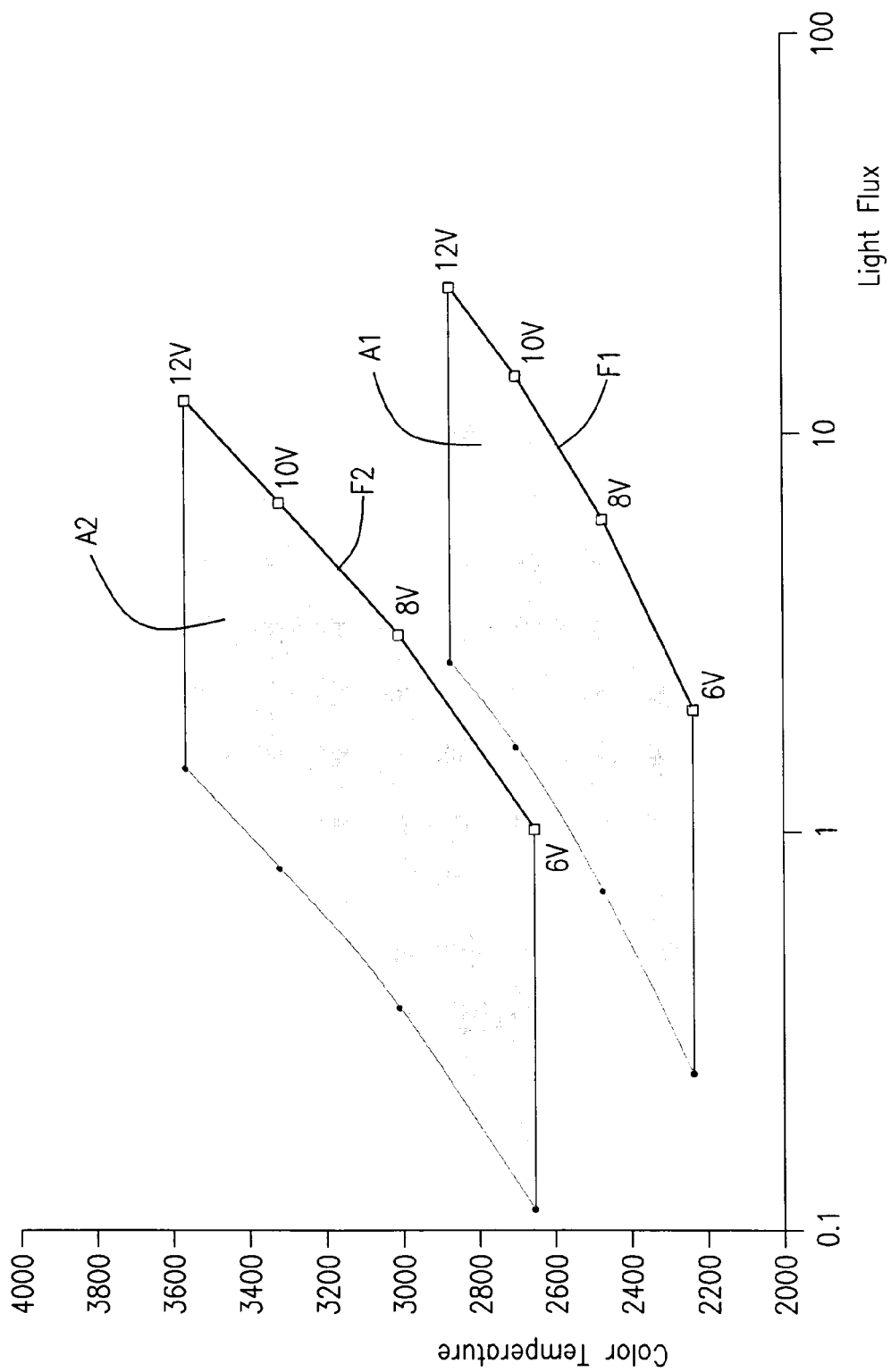
FIG. 4 shows the dependence of color temperature on luminous flux for various components and combinations thereof of a transmitted-light base depicted in FIG. 1, measured at the exit pupil of a microscope.

In FIG. 4, the color temperature of the light source (in Kelvins) is plotted as a function of the luminous flux (logarithmically in lumens (lm)) of a reflector lamp. The color temperature represents that temperature of a black body which exhibits, in the spectral region under consideration, the same spectral intensity distribution as the relevant light source. Curve F1 is a representation of this correlation for various voltages (6 V, 8 V, 10 V, and 12 V) for the reflector lamp alone. Curve F2 represents this relationship for the combination of reflector lamp 3 and color conversion filter 6. The curves depicted are schematic. Color conversion filter 6 visibly increases the color temperature, and thus results in a blue shift of the spectral intensity distribution. With transmitted-light bases common hitherto, possible settings for the color temperature and luminous flux are limited to the two curves F1 and F2. With transmitted-light base 1 according to the present invention having mechanical brightness regulation system 4, curves F1 and F2 are obtained with mechanical brightness regulator 4 in the open position. Upon the closure of mechanical brightness regulator 4, the image brightness is decreased with no change in color temperature. Curves F1 and F2 thus generate respective surfaces A1 and A2 that are available for possible settings. Surfaces A1 and A2 thus describe the advantage of the transmitted-light base according to the present invention as compared with conventional transmitted-light bases having an integrated illumination system, which exhibit only curves F1 and F2.

Be it noted that FIG. 4 is merely exemplary and schematic in nature; in particular, color conversion filters that cause different shifts, in particular also red shifts, are usable. Curves and surfaces similar to those depicted in FIGS. 4 and 5 are obtained when a system having a lamp and collector lens is used.

Figure 5:
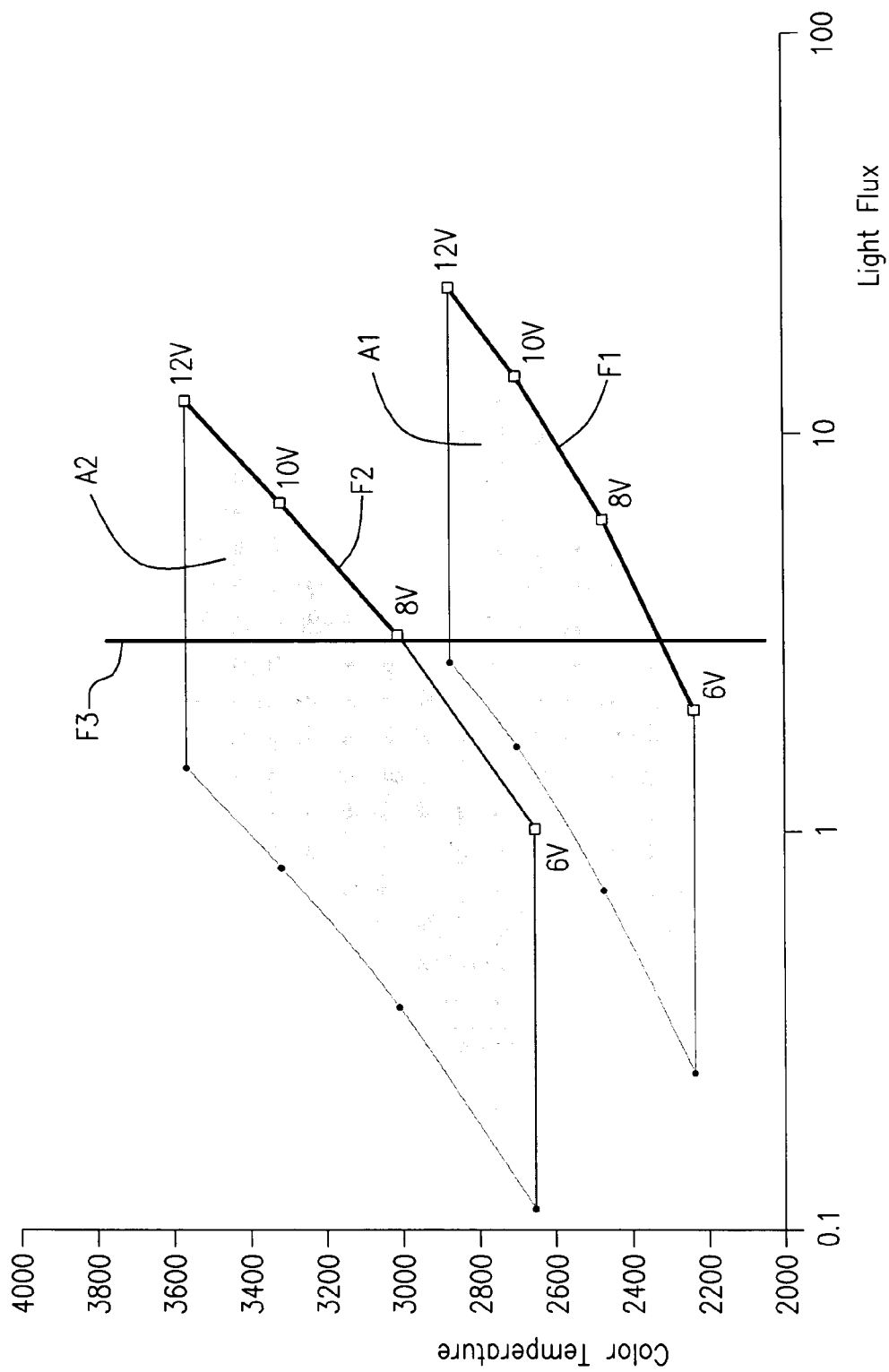
FIG. 5 shows the diagram of FIG. 4 with a comfortable image brightness drawn in; and, FIG. 6 schematically depicts a stereomicroscope having the transmitted-light base according to the present invention for object examination.

FIG. 5 is a depiction analogous to FIG. 4, but here the image brightness is represented on the basis of the luminous flux measured at the exit pupil of the microscope for a typical application. In this application, F3 designates the location of the comfortable image brightness. Surfaces A1 with right edge F1 and A2 with right edge F2 shift to the right or left with respect to F3 depending on the specimen density (i.e., the nature of object 15), the illumination mode of transmitted-light base 1, and the magnification of microscope 21. The position of F3 may in turn be user-dependent.

The method for regulating the illumination intensity of a transmitted-light base consists in selecting the image brightness at the maximum illumination intensity requirement by setting the lamp voltage and/or by filter selection, with the louver open, in such a way that curve F1 (without color conversion filter) or F2 (with color conversion filter) intersects vertical line F3 (this guarantees the requisite high dynamic range). Only louver 4 is then actuated during specimen examination. Because the presetting is accomplished at the maximum illumination intensity requirement and with the louver open, an actuation of the louver can result only in a decrease in the luminous flux and radiant intensity. The low dynamic range required for illumination regulation can be met by actuation of the louver, closure of the louver making available a region that is represented in FIG. 4 by a horizontal line in surface A1 or A2 at the color temperature that corresponds to the intersection point of vertical line F3 with curve F1 or F2, respectively.

Figure 6:
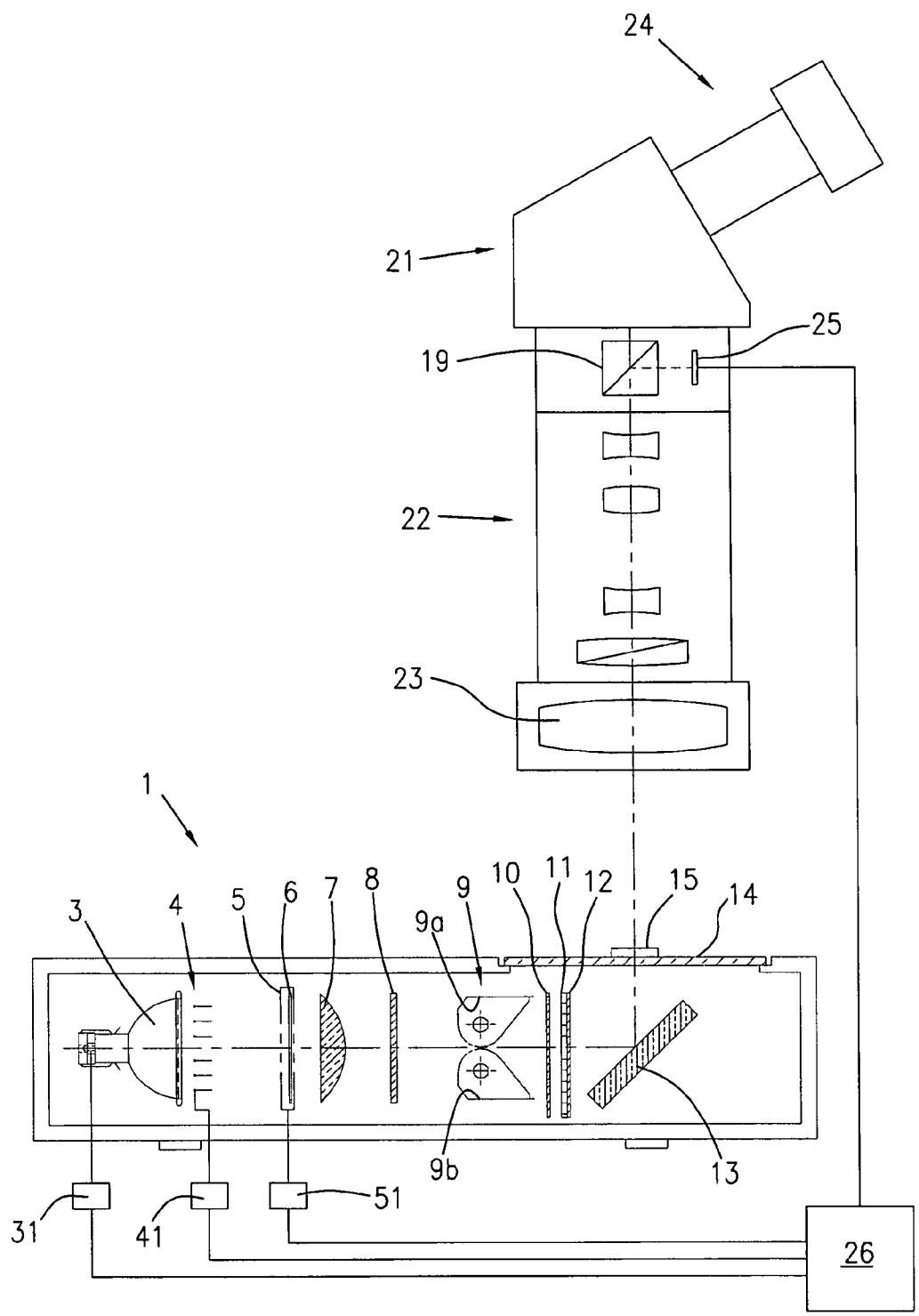

FIG. 6 shows one possible configuration for specimen examination using a stereomicroscope 21. Transmitted-light base 1, which corresponds in its configuration to the one depicted in FIG. 1, is once again schematically depicted. Object 15 to be examined is located on object plane 14 of transmitted-light base 1. A stereomicroscope 21, known per se, is depicted only schematically, the microscope objective here being labeled 23 and the zoom systems for the left and right stereoscopic channels being labeled 22. The side view of stereomicroscope 21 means that only one of the two stereo channels, and therefore also only one zoom system 22, is visible, since they lie behind one another in this side view. An operator can view a highly magnified, three-dimensional image of object 15 by looking through eyepieces 24. It is also possible, however, to record the magnified image using a digital camera (not depicted). In this exemplifying embodiment, a sensor 25 for determining the image brightness is provided on the image side. By means of an optical element such as a semitransparent mirror 19, part of the light is coupled out of the stereo channel and directed to sensor 25. The output of sensor 25 is connected to a control unit 26. Control unit 26 in turn controls adjustment device 41 of louver 4, as well as electrical power regulation system 31 of reflector lamp 3 and positioning member 51 of filter insert 5 with color conversion filter 6.

The configuration depicted in FIG. 6 thus makes possible completely automatic regulation of the illumination intensity and the spectral intensity distribution of a transmitted-light base 1 for an object examination at constant image brightness by imaging of object 15 using stereomicroscope 21. A digital camera can also be used as sensor 25 (and can replace it).

As preparation, firstly object 15 is put in place, a suitable objective 23 is selected and focused, the observation mode of the transmitted-light base (vertical or flat illumination or contrasting method) is set, and the mechanical brightness regulation system (in this case, the louver) is fully opened. The setting having the maximum requirement for illumination intensity is ascertained by setting zoom 22 to the maximum magnification appropriate for the specimen (object 15) and setting the illumination to be as flat as is appropriate and/or closing down stops 9a, b to an extent that is still suitable for the specimen. The image brightness is then adjusted to approximately the comfortable brightness F3 (see FIG. 5) by way of electrical power level regulation system 31 and/or by inserting a color conversion filter 6 into filter insert 5. The working point that is ascertained is located on the right side of A1 or A2, since mechanical brightness regulation system (louver) 4 is completely open. During the subsequent examination of the specimen, the image brightness is increased by modifying the illumination mode in transmitted-light base 1 or by actuating zoom 22, so that this brightness change can be compensated for, without causing a change in color temperature, by closing mechanical brightness regulation device 4.

By means of control device 26 depicted in FIG. 6, preselection of the working point in the vicinity of the comfortable brightness F3, and subsequent brightness regulation, can be accomplished entirely automatically during specimen examination. For this purpose, sensor 25 sends the necessary image brightness data to control unit 26. In order to ascertain the working point, after the above-described setting at the maximum requirement for illumination intensity and with the mechanical brightness regulation system fully open, electrical power regulation system 31 of reflector lamp 3 is activated by control unit 26 until the desired image brightness is set and is reported by sensor 25 to control unit 26. The dependence of the spectral intensity distribution (color temperature) on the voltage (output) of the type of lamp being used is generally known or can be ascertained. Control unit 26 can consequently, based on the value set on electrical power regulation system 31, automatically ascertain a shift in the spectral intensity distribution (color temperature). In that case control unit 26 can activate positioning member 51 of filter insert 5 in such a way that the specified spectral intensity distribution is generated (or restored). As is evident from FIG. 5, it is possible for a correction of the color temperature at a given lamp voltage to cause a departure from the point of comfortable image brightness F3, so that the desired image brightness must once again be set by regulating the output of light source 3.

After presetting is complete, control unit 26 corrects the image brightness during specimen examination. If the illumination mode of transmitted-light source 1 remains unchanged during the object examination, and only the zoom setting of microscope zoom 22 changes, control unit 26 can limit itself primarily or exclusively to brightness regulation by activating adjustment device 41 of mechanical brightness regulator 4. If the change in image brightness can no longer be compensated for by that means alone, control unit 26 must then act on power regulation system 31 and/or positioning member 51.

The present invention makes possible optimum image brightness regulation for object examinations using high-power stereo zoom microscopes and transmitted-light bases having an integrated light source.

PARTS LIST

1 Transmitted-light base
2 Optical axis
3 Reflector lamp
4 Mechanical brightness regulator, louver
4a, b, c, d, e, f Slats
5 Filter insert
6 Color conversion filter
7 Collector lens
8 Frosted glass disk
9 Aperture device, stop
10 Fresnel lens
11 Diffuser
12 Fresnel lens
13 Deflection mirror
13a Tilted position of (13)
14 Object plane
15 Object
16 Illumination direction 17 Lamp
18 Collector lens
19 Semi-transparent mirror
20 Profile of slats, sawtooth profile
21 Zoom microscope, stereo zoom microscope
22 Zoom system
23 Microscope objective
24 Eyepiece
25 Sensor for image brightness
26 Control unit
31 Electrical power regulation system
41 Adjustment device
51 Positioning member of (5)

What is claimed is:

1. A transmitted-light base (1) for illuminating an object (15) for imaging through a zoom microscope (21), the transmitted-light base (1) comprising
    an integrated light source (3; 17, 18) having an associated electrical power regulation system (31) for generating a suitable radiation flux, and
    means (5, 6), capable of being added downstream, for generating a specified spectral intensity distribution,
wherein the light source is embodied as a reflector lamp (3); and arranged next to the light exit side of the reflector lamp (3) is a continuously controllable mechanical brightness regulator (4) having an associated adjustment device (41) by way of which the brightness regulator (4) is activatable in such a way that the illumination intensity of the transmitted-light base (1) is controllable with no change in the spectral intensity distribution.

2. The transmitted-light base according to claim 1, wherein the distance between the mechanical brightness regulator (4) and the light exit side of the reflector lamp (3) corresponds at most to half the reflector diameter of the reflector lamp (3).

3. The transmitted-light base according to claim 1, wherein the illumination intensity of the transmitted-light base (1) is controllable by the mechanical brightness regulator (4) at least in a range of 1:5.

4. The transmitted-light base according to claim 1, wherein the mechanical brightness regulator (4) is embodied as a louver (4) having slats (4a-4f).

5. The transmitted-light base according to claim 4, wherein the louver (4) comprises at least four slats (4a-4f).

6. The transmitted-light base according to claim 4, wherein the slats (4a-4f) are arranged parallel to one another, each tiltable about an axis in a plane perpendicular to the illumination direction (16).

7. The transmitted-light base according to claim 4, wherein the slats (4a-4t) of the louver (4) are fabricated from metal.

8. The transmitted-light base according to claim 4, wherein the slats (4a-4f) comprise a profile (20) at least along their longitudinal edges.

9. The transmitted-light base according to claim 8, wherein the profile (20) possesses the form of a sawtooth profile (20).

10. A zoom microscope having a zoom system (22) for imaging an object (15), having a transmitted-light base (1) according to claim 1 for illuminating the object (15).

11. The zoom microscope according to claim 10, which is embodied as a stereo zoom microscope.

12. The zoom microscope according to claim 10, wherein a sensor (25) for determining the image brightness is provided on the image side; and furthermore a control unit (26) is provided for actuating the mechanical brightness regulator (4) of the transmitted-light base (1) as a function of the image brightness determined by means of the sensor (25).

13. The zoom microscope according to claim 10, wherein a sensor (25) for determining the image brightness is provided on the image side; and furthermore a control unit (26) is provided for actuating the electrical power regulation system (31) of the light source (3; 17, 18), and the means (5, 6) for generating a specified spectral intensity distribution of the transmitted-light base (1), as a function of the image brightness determined by the sensor (25).

14. A transmitted-light base (1) for illuminating an object (15) for imaging through a zoom microscope (21), the transmitted-light base (1) comprising
    an integrated light source (3; 17, 18) having an associated electrical power regulation system (31) for generating a suitable radiation flux, and
    means (5, 6), capable of being added downstream, for generating a specified spectral intensity distribution,
wherein the light source is embodied as a lamp (17) having a downstream collector lens (18); and arranged close to the collector lens (18) and next to the light source is a continuously controllable mechanical brightness regulator (4) having an associated adjustment device (41) by way of which the brightness regulator (4) is activatable in such a way that the illumination intensity of the transmitted-light base (1) is controllable with no change in the spectral intensity distribution.

15. The transmitted-light base according to claim 14, wherein the distance between the mechanical brightness regulator (4) and the vertex of the collector lens (17) corresponds at most to half the diameter of the collector lens (17).

16. The transmitted-light base according to claim 14, wherein the illumination intensity of the transmitted-light base (1) is controllable by the mechanical brightness regulator (4) at least in a range of 1:5.

17. The transmitted-light base according to claim 14, wherein the mechanical brightness regulator (4) is embodied as a louver (4) having slats (4a-4f).

18. A method for regulating the illumination intensity and the spectral intensity distribution of a transmitted-light base (1) for an object examination by imaging of an object (15) using a zoom microscope (21),
    wherein the transmitted-light base (1) comprises an integrated light source (3; 17, 18) with an associated power regulation system (31) for generating a suitable radiation flux; means (5, 6), capable of being added downstream, for generating a specified spectral intensity distribution; and a continuously controllable mechanical brightness regulator next to said integrated light source (4),
    the electrical power regulation system (31) of the light source (3; 17, 18), or the means (5, 6) for generating a specified spectral intensity distribution, or the mechanical brightness regulator (4) being actuated independently of one another in order to set a desired image brightness and spectral intensity distribution.

19. The method according to claim 18, wherein once presetting of the desired image brightness and spectral intensity distribution has been performed, the image brightness is kept constant during the object examination primarily or solely by adjustment of the mechanical brightness regulator (4).

20. The method according to claim 18, characterized by the following steps, steps A) to D) describing the presetting and step E) the examination phase:
    A) setting, on the transmitted-light base (1) and on the microscope (21), the examination condition having the maximum requirement for illumination intensity;

B) setting the mechanical brightness regulator (4) to its position of least-possible attenuation of the illumination intensity, and removing the means (5, 6) for generating a specified spectral intensity;

C) setting the desired image brightness by corresponding power regulation of the light source (3; 17, 18);

D) in the event of an undesired spectral intensity distribution or insufficient controllability of the electrical power regulation system (31), introducing the means (5, 6) for generating a specified spectral intensity distribution and, if applicable, resetting the desired image brightness by regulating the output of the light source (3; 17, 18); and E) actuating primarily or solely the mechanical brightness regulator (4), so that the image brightness is kept constant at the preset spectral intensity distribution during the object examination, in particular in the context of a zoom operation.

21. The method according to claim 20, having a further step D1) that follows step D) and encompasses transfer of the settings of the presetting operation effected by steps A) to D) to a control unit (26).

22. The method according to claim 21, in which after definition of a spectral intensity distribution and a desired image brightness, the control unit (26) actuates the electrical power regulation system (31) of the light source (3), the mechanical brightness regulator (4), and the means (5, 6) for generating a specified spectral intensity distribution in such a way that the specified spectral intensity distribution and the image brightness remain almost constant during the object examination, the mechanical brightness regulator (4) being activated as the first priority for that purpose.

* * * * *

UNITED STATES PATENT AND TRADEMARK OFFICE
CERTIFICATE OF CORRECTION

PATENT NO.         : 7,394,593 B2                                   Page 1 of 1
APPLICATION NO.    : 11/286835
DATED              : July 1, 2008
INVENTOR(S)        : Ruedi Rotterman et al.

It is certified that error appears in the above-identified patent and that said Letters Patent is hereby corrected as shown below:

In Column 15, Claim 7, line 2, "(4a-4t)" should be "(4a-4f)"

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,394,593 B2 | Page 1 of 1 |
| APPLICATION NO. | : 11/286835 | |
| DATED | : July 1, 2008 | |
| INVENTOR(S) | : Ruedi Rotterman et al. | |

It is certified that error appears in the above-identified patent and that said Letters Patent is hereby corrected as shown below:

In Column 15, Claim 7, line 49, "(4a-4t)" should be "(4a-4f)"

This certificate supersedes the Certificate of Correction issued November 18, 2008.

Signed and Sealed this

Ninth Day of December, 2008

JON W. DUDAS
*Director of the United States Patent and Trademark Office*